UNITED STATES PATENT OFFICE.

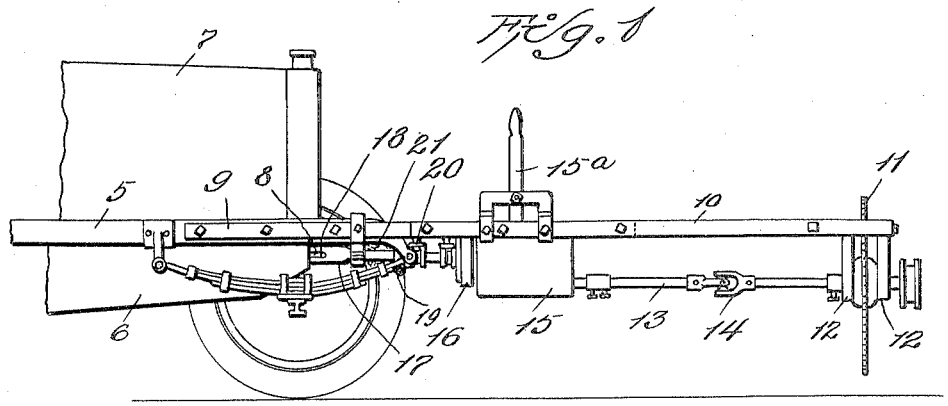
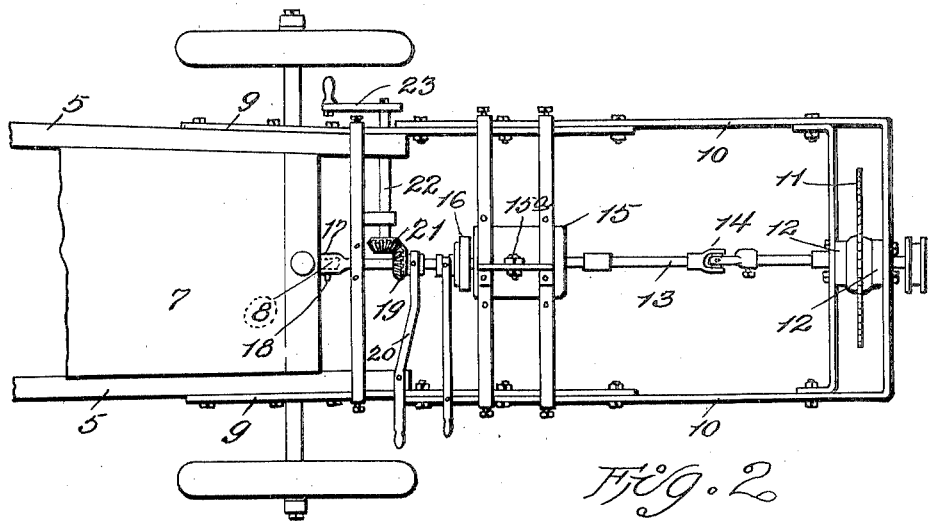

GEORGE A. BONELLI, OF KINGMAN, ARIZONA.

POWER-TRANSMISSION ATTACHMENT FOR AUTOMOBILES.

1,399,738.   Specification of Letters Patent.   Patented Dec. 13, 1921.

Application filed November 29, 1919. Serial No. 341,495.

*To all whom it may concern:*

Be it known that I, GEORGE A. BONELLI, a citizen of the United States, residing at Kingman, Mohave county, and State of Arizona, have invented certain new and useful Improvements in Power-Transmission Attachments for Automobiles, of which the following is a specification, reference being had therein to the accompanying drawing.

My invention relates to improvements in power transmission attachments for automobiles, and my object is to provide a mechanism, which may be readily, detachably secured to the automobile, whereby the motor of the automobile may be utilized for the operation of tools or machines such as road making devices or mowing machines, which travel with the automobile; or, stationary machines or tools such as saws, churns, pumps, grindstones and the like. A further object being to provide means for such mechanism whereby the tool or machine operated by the automobile motor may be controlled independently of the motor control.

Referring to the drawing—

Figure 1 is a side elevation of a mechanism embodying my improvements.

Fig. 2 is a plan view of a mechanism embodying my improvements.

The numeral 5 designates the chassis of an automobile, 6 the engine case, 7 the hood and 8 the engine shaft, all of which may be of ordinary construction.

To the chassis I detachably secure the rails 9 which project forwardly beyond and at each side of the automobile, and to the rails 9 I attach a frame 10, which rails and frame constitute a support for my improved mechanism for driving extraneous tools or machines, and which frame may be utilized to support the tool or machine in order that the tool or machine may be carried by or advanced with the automobile in its work.

In my drawing I show the tool 11 as a rotary saw, supported in bearings 12, carried by the frame 10, but in no sense do I mean to limit myself to such a tool, or to a tool or machine carried by the frame 10, as obviously the automobile may be stationed adjacent any power driven machine or tool and its motor connected therewith by my power transmission attachment.

The driven shaft 13 of my attachment comprises a universal joint 14, whereby I am enabled to readily connect the motor shaft, 8, with tools or machines alined with the motor shaft, as for instance a sickle bar of a mowing machine operating next the ground, or to a machine laterally non-alined with the motor shaft.

Connected with the driven shaft there is a transmission 15, having a control lever 15ª, whereby to control the speed and direction of rotation of the driven shaft independently of the motor shaft, and which transmission is provided with a clutch 16, whereby the driven shaft may at will be connected or disconnected with the motor-shaft. In my drawing I show the driven shaft of my attachment as being arranged for connection with the front, or crank end of the engine shaft, as by means of a socket 17, having a pin and slot connection 18 with the engine shaft. In this arrangement I provide my attachment with means for "cranking" the motor comprising a gear wheel 19 slidably mounted on the driven shaft 13, having a shifting lever 20 and a gear wheel 21, supported on a shaft 22 in the frame 10, and a crank 23 for turning the shaft 22.

By means of the peculiar construction of my attachment the automobile for its common employment may be completely stripped of all the parts of my attachment, and when it is desired to employ the automobile motor to operate other tools or machines, the automobile is driven to the tool or machine, the rails 9 secured to the chassis, and the frame 10 supporting the transmission and other controls, is secured to the rails and the shaft 13 connected with the tool. The motor is then set in motion and the tool controlled through the clutch 16 and the transmission 15.

Having thus described my invention what I claim as new and desire to have secured to me by the grant of Letters Patent, is—

1. A power transmission attachment for automobiles comprising a chassis; forwardly projecting rails detachably secured to the sides of said chassis; a frame secured to said rails; a driven shaft mounted in said frame and arranged for connection with the engine shaft; and means for cranking the engine shaft comprising a gear member slidably mounted on said driven shaft and an engaging crank and gear carried by said frame.

2. A power transmission attachment for automobiles comprising a chassis; forwardly projecting rails detachably secured to the sides of said chassis; a frame secured to said rails; a driven shaft having a clutch-controlled transmission and mounted in said frame and arranged for connection with the engine shaft; and means for cranking the engine shaft comprising a gear member slidably mounted on said driven shaft and an engaging crank and gear carried by said frame.

3. A power transmission attachment for automobiles comprising a chassis; forwardly projecting rails detachably secured to the sides of said chassis; a frame secured to said rails; a driven shaft embodying a universal joint and a clutch-controlled transmission mounted in said frame and arranged for connection with the engine shaft; and means for cranking the engine shaft comprising a gear member slidably mounted on said driven shaft and an engaging crank and gear carried by said frame.

4. A power transmission attachment for automobiles comprising a chassis; a frame detachably secured to said chassis; a driven shaft embodying a universal joint and a clutch-controlled transmission mounted in said frame and arranged for connection with the engine shaft; and means for cranking the engine shaft comprising a gear member slidably mounted on said driven shaft and an engaging crank and gear carried by said frame.

In testimony whereof I hereunto affix my signature.

GEORGE A. BONELLI.